Sept. 30, 1952
J. F. KEYS
2,612,022
INTERNAL-COMBUSTION ENGINE WITH ROTARY
CONSTANT VOLUME COMBUSTION CHAMBER
Filed Dec. 7, 1945
4 Sheets-Sheet 1
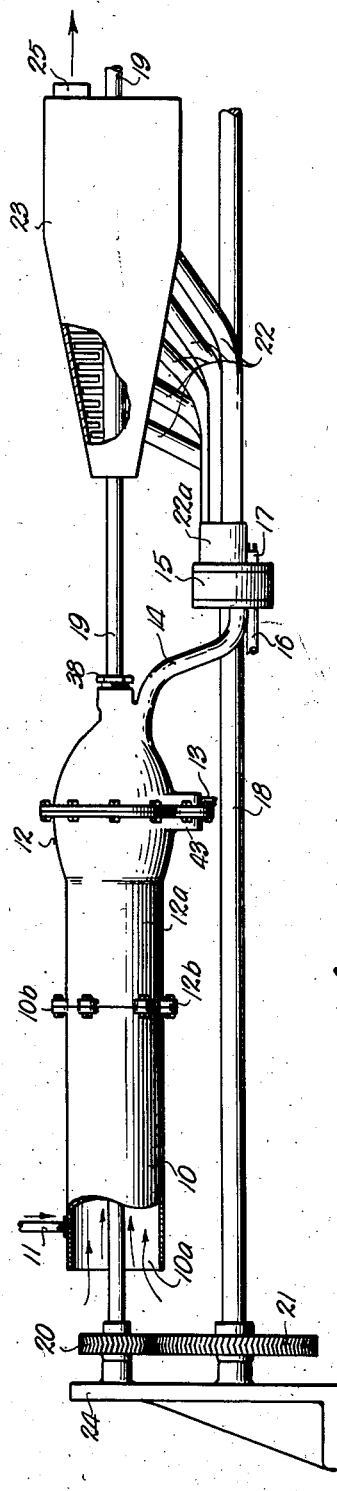
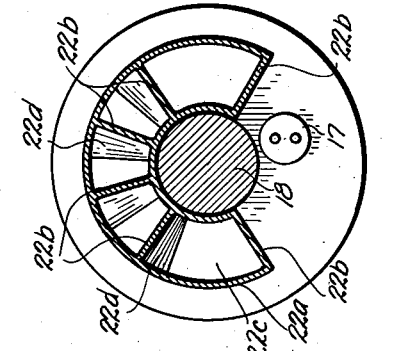
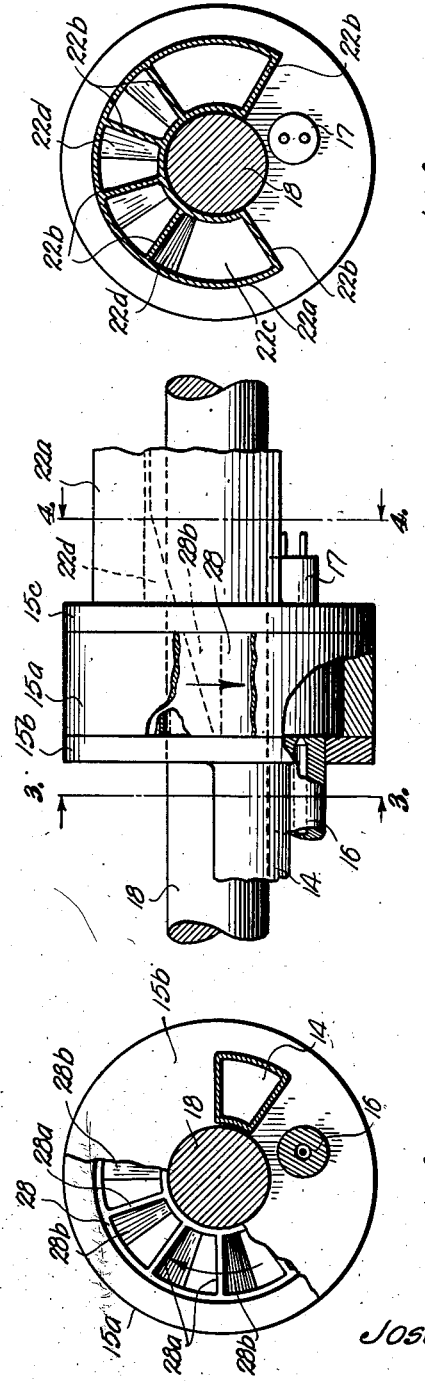
Inventor
Joseph F. Keys

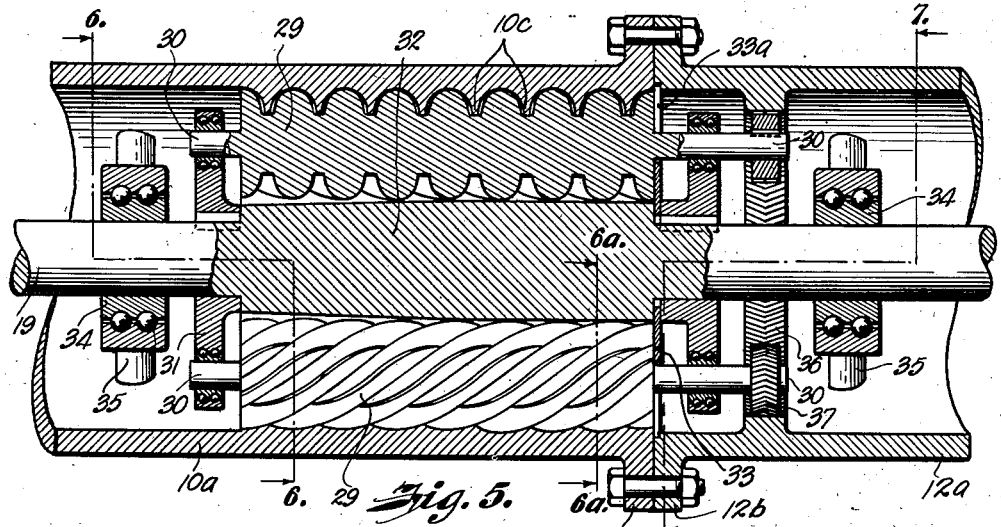
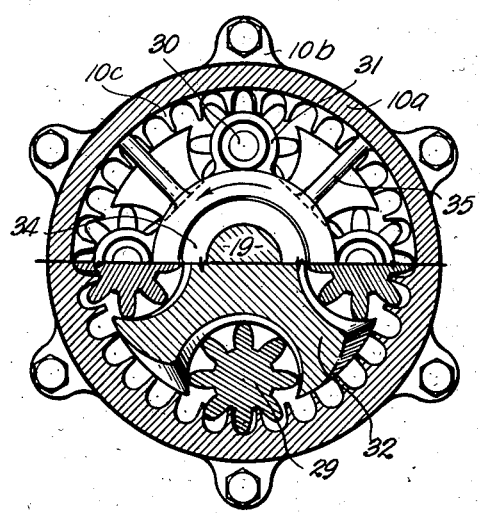
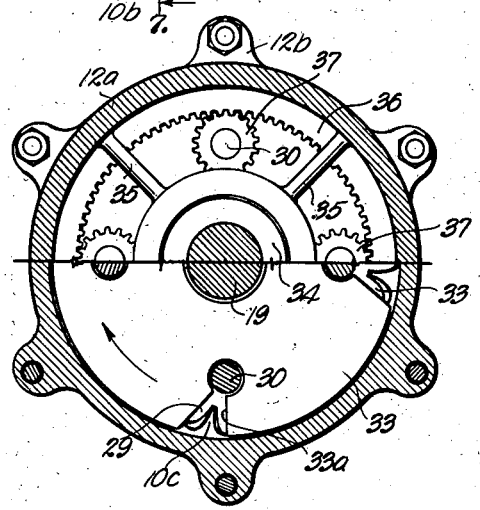

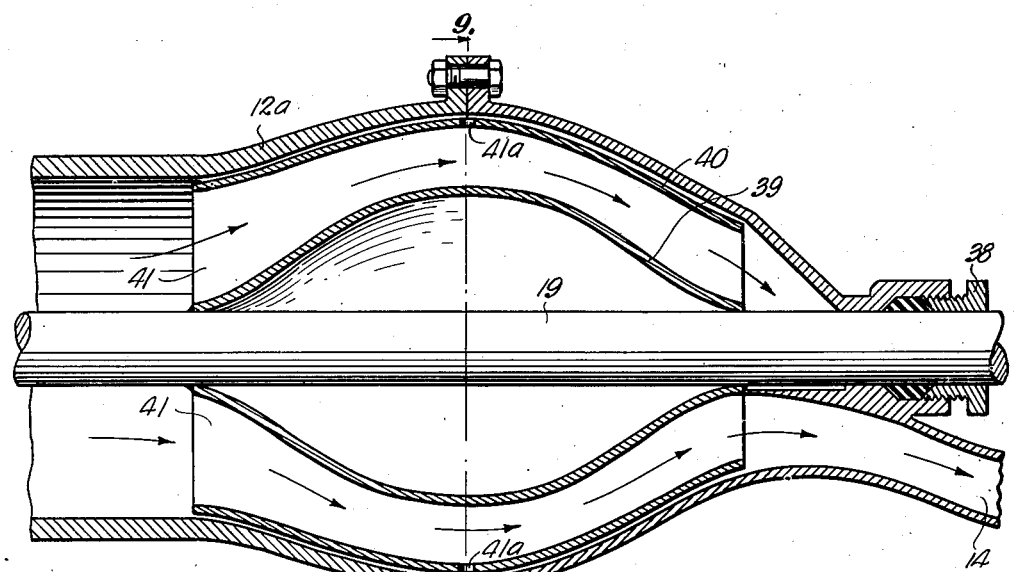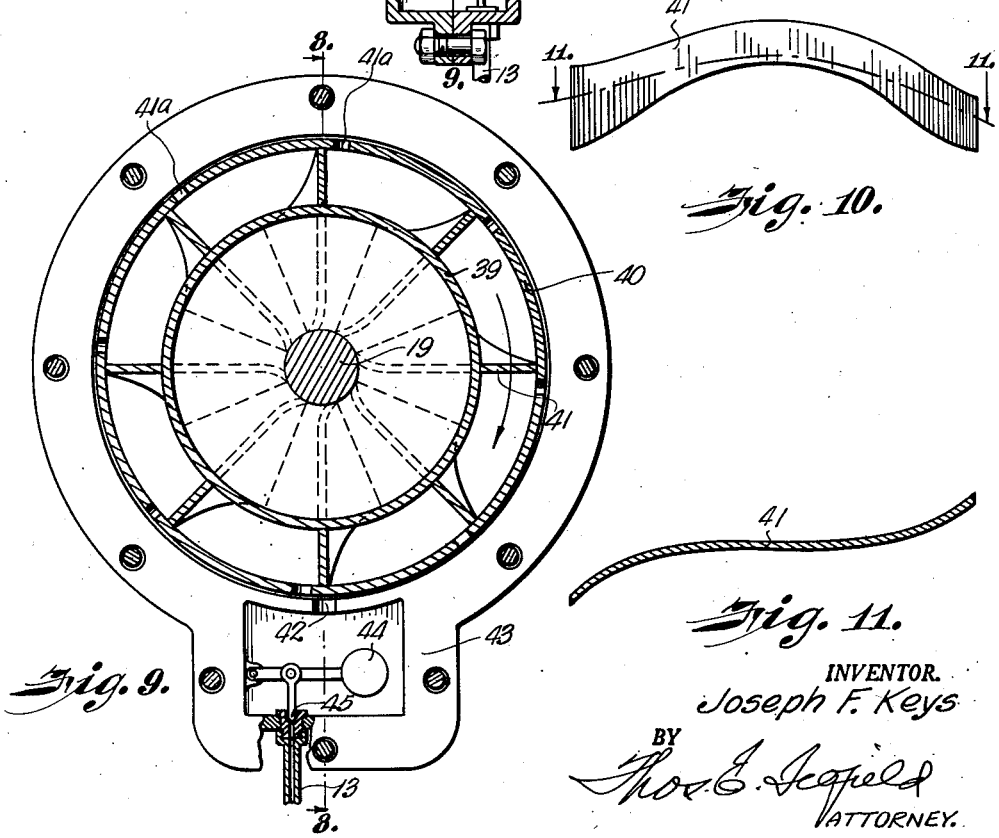

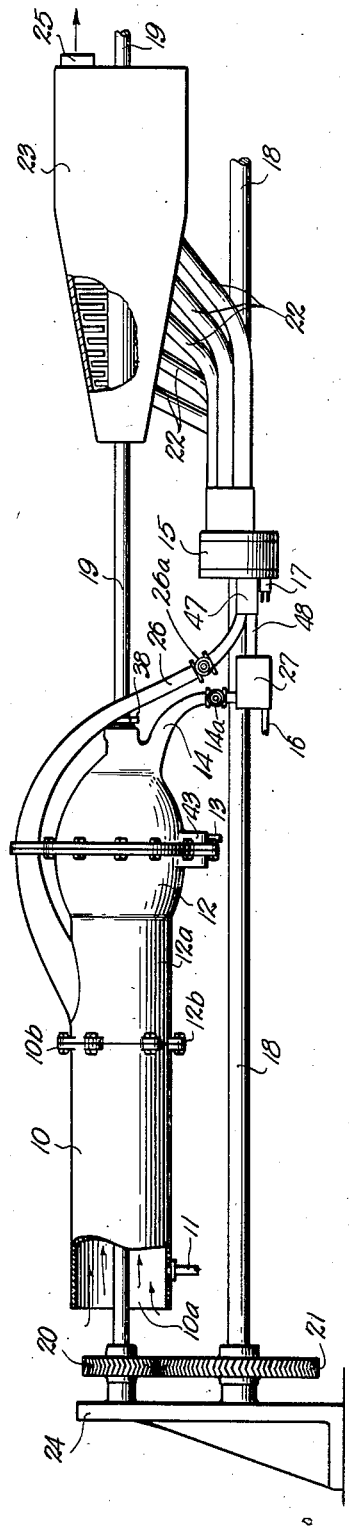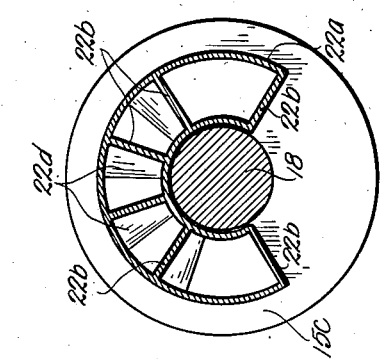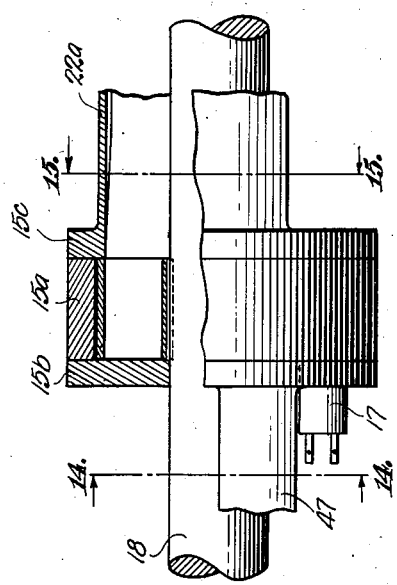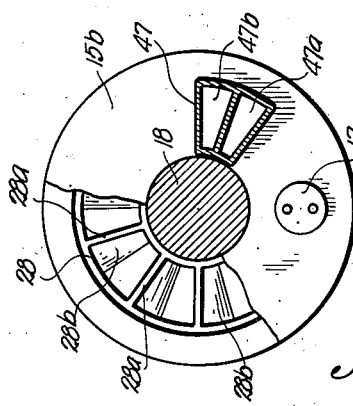

Patented Sept. 30, 1952

2,612,022

UNITED STATES PATENT OFFICE 2,612,022

INTERNAL-COMBUSTION ENGINE WITH ROTARY CONSTANT VOLUME COMBUSTION CHAMBER

Joseph F. Keys, Wichita, Kans.

Application December 7, 1945, Serial No. 633,299

14 Claims. (Cl. 60—39.35)

This invention relates to improvements in a power unit and refers more particularly to a unit employing a compressor and gas propelled prime mover on a single shaft timed or synchronized with a constant volume combustion chamber operated under relatively high pressure.

The unit seeks to obtain the advantages of decreased temperature resulting from the introduction of moisture to the air supplied to the compressor and regulates the amount of moisture in the air supplied to the combustion chamber by a separator interposed between the compressor and combustion chamber.

An object then is to provide a power unit in which the compressor, separator and gas propelled prime mover are mounted on a continuous shaft operating in conjunction with a combustion gas source geared to and timed with the compressor shaft to supply high pressure gas to the prime mover.

Another object is to provide a unit wherein moisture is added to the air supplied to the compressor and separated from the air prior to its introduction to the combustion chamber.

Another object is to provide a supplementary bypass connection between the compressor discharge and combustion chamber for regulating the amount of moisture and dry air supplied to the latter.

A further object is to provide an improved type of compressor design of the helical gear type utilizing a plurality of gears arranged about the periphery of a central rotor and meshing with an internal gear on the inside of the interior of the compressor housing to increase the capacity and improve efficiency of the compressor.

Another object is to provide a power unit employing a constant volume combustion chamber interposed between the compressor and prime mover to which is continuously introduced air and fuel to form a combustible mixture which is ignited in the combustion chamber and is discharged to the gas propelled prime mover.

Other and further objects will appear from the following description.

In the accompanying drawings which form a part of the specification and are to be read in conjunction therewith and in which like reference numerals indicate like parts in the various views, Fig. 1 is a diagrammatic side elevational view of a power unit embodying the invention.

Fig. 2 is an enlarged elevational view of the combustion chamber shown in Fig. 1 with parts broken away and parts in section, Fig. 3 is a view taken along the line 3—3 in Fig. 2 in the direction of the arrows, Fig. 4 is a view taken along the line 4—4 in Fig. 2 in the direction of the arrows, Fig. 5 is an enlarged sectional view of the compressor, Fig. 6 is a view taken along the line 6—6 in Fig. 5 in the direction of the arrows, Fig. 6a is a view taken along the line 6a—6a in Fig. 5 in the direction of the arrows, Fig. 7 is a view taken along the line 7—7 in Fig. 5 in the direction of the arrows, Fig. 8 is a sectional view of the centrifugal air-moisture separator taken along the line 8—8 in Fig. 9, Fig. 9 is a view taken along the line 9—9 in Fig. 8, Fig. 10 is a detail of the radial vanes or partitions between the inner and outer revolving shells of the separator, Fig. 11 is a sectional view taken along the line 11—11 in Fig. 10 in the direction of the arrows, Fig. 12 is a diagrammatic side view of a modified type of power unit in which dry air from the separator and moist air from the compressor are supplied to the combustion chamber, Fig. 13 is an enlarged elevation of the combustion chamber shown in Fig. 12 with parts in section, Fig. 14 is a view taken along the line 14—14 in Fig. 13, and Fig. 15 is a view taken along the line 15—15 in Fig. 13.

Referring to the drawings and briefly describing the operation of the power unit shown in Fig. 1 air is supplied to the compressor 10 through the inlet opening 10a, as indicated by the arrows. At the inlet moisture is supplied through a plurality of pipes 11, the injection of the moisture being through mist-producing spray jets to disperse the moisture uniformly through the air. On being discharged from the compressor the moisture laden air is passed through a separator 12 where the water is removed from the air by centrifugal separation. The water is drawn off from the separator through pipe 13 and dry air through pipe 14, the latter to be introduced to the combustion chamber 15. In the combustion chamber the dried air is supplied with fuel through pipe 16 and the combustible mixture ignited by a hot spot or electrical ignition means diagrammatically shown at 17. Within the combustion chamber is a radially partitioned rotor mounted upon the shaft 18 driven from the compressor shaft 19 through meshing gears 20 and 21.

After ignition in combustion chamber 15, which is of the constant volume type, the ignited gases are discharged at decreasing pressures through a plurality of ducts 22 and introduced to a gas propelled prime mover diagrammatically shown at 23 as a conventional multi-stage gas turbine. Ducts 22 are spaced lengthwise of the turbine to communicate with the successive stages or pressure zones therein, the zone of maximum pressure being at the small end.

The compressor 10, water separator 12 and prime mover 23 are mounted upon a continuous shaft 19. Compressor shaft 19 and shaft 18 which drive the rotor in the combustion chamber are supported at one end by the standard 24 and at their opposite ends by suitable bearing supports not shown. The exhaust gases are discharged from the prime mover through pipe 25.

A modified type of power unit is shown diagrammatically in Fig. 12. The principal difference between the unit shown in Figs. 1 and 12 is the provision in the latter for transferring moist air from the compressor discharge directly to the combustion chamber through a supplementary or auxiliary pipe 26. In the modified type unit the dry air from the separator and fuel are combined in a carbureting device 27 and the combustible mixture supplied to the combustion chamber in a manner to assure ignition and without objectionable blending with the moist air supplied through pipe 26 as will be hereinafter explained.

To facilitate an understanding of the units their elements will be described in the order that they occur in the drawings.

*Combustion chamber—Figs. 2, 3 and 4*

Interposed between the water separator and prime mover is a constant volume combustion chamber designated in Figs. 1 and 12 by the numeral 15. This chamber consists of a cylindrical housing 15a closed at its ends by plates 15b and 15c. The housing is supported on a suitable base or standard not shown. The shaft 18 extends centrally through the housing and on the shaft within the combustion chamber is mounted a rotor 28 divided by radial partitions 28a. The inlet plate 15b of the chamber has an air inlet port 14 and a fuel supply jet 16. Closure plate 15c of the chamber is equipped with an outlet manifold 22a to which pipes 22 are connected. Mounted in plate 15c adjacent the low pressure outlet port 22c is an electrically controlled hotspot or plug 17 for igniting fuel air mixture introduced through pipes 16 and 14. The operating cycle, in so far as the combustion chamber is concerned, may be briefly described as follows:

Dry air from the separator is introduced through pipe 14 and fuel through pipe 16. The rotor within the combustion chamber is revolving with the shaft 18 in the direction shown by the arrow in Fig. 3. The air inlet is located opposite the low pressure port 22c and serves as a scavenging agent besides introducing air for combustion. The fuel is introduced to the cells as they rotate to a position opposite the hot-spot plug. In other words, the introduction of the air takes place when a cell is in registration with the inlet port 14 and outlet 22c and fuel injection when the cell registers substantially with the igniter. With ignition and combustion the temperature of the charge increased while it is maintained at a constant volume. Consequently, the pressure of the gaseous mixture within the cell is greatly increased. Each successive cell receiving a combustible charge is successively ignited and rotated to a discharge position where the gases are exhausted through the manifold into pipes 22 to drive the prime mover. It will be noted that all radial partitions 28a of the rotor are tapered as shown at 28b in Figs. 2 and 3 and certain of the manifold partitioned as shown at 22d in Figs. 2 and 4 to close the exhaust ports while a cell is passing from one pressure duct of the manifold to an adjacent duct of lower pressure. The details of the fuel injector and the electrically controlled hot spot for igniting the gases are all of minor consequence in so far as this invention is concerned, it being essential only that the fuel injection and ignition is efficiently accomplished.

The construction of the combustion chamber has been described and it would now appear to be in order to describe in somewhat more detail the operation.

Referring first to the combustion chamber shown in Fig. 1, as a cell 28b of the rotor revolves to a position in registration with the intake manifold a supply of dried air from the separator is introduced through pipe 14. As this air enters it exhausts from the opposite side of the cell remaining power gas which flows out through a low pressure duct of the exhaust manifold. The cell charged with dried air is then rotated to a position in registration with the fuel jet and ignition hot spot or plug. At this position fuel is injected and the mixture ignited. At the time of ignition and through the combustion period this cell of the rotor is sealed from both intake and exhaust and remains at constant volume. Further rotation uncovers the high pressure section of the exhaust manifold through which a portion of the high pressure power gas is exhausted into the conduit which directs the gas to a high pressure nozzle of the prime mover. With further rotation the cell which is now exhausting the confined power gas moves across the lower pressure ducts of the manifold discharging its gas into the manifold ducts until it reaches the final stage which is the beginning of a new cycle. In the final low pressure stage the cell again registers both with the intake manifold and with the low pressure duct of the exhaust manifold. It should be noted that the exhaust sides of the radial cell walls and the intake side of the dividing walls of the exhaust manifold have baffles, as shown in Figs. 3 and 4, which effectively function as valves as the cells are rotated by the manifold closing the cells to the exhaust passages while passing from one pressure duct of the manifold to a lower pressure duct and providing an open passageway when a cell is in registration with only one exhaust duct. This valve action is, however, effective principally in the intermediate or narrow ducts of the exhaust manifold since the high and low pressure sections are of double the width and the flow through these particular ducts is continuous. In the intermediate narrow sections the flow is intermittent but at such a rapid rate that the pulsations produce a substantially continuous flow of power gas through the ducts. Thus, it will be seen that the power gas generated in each cell of the rotor is exhausted through the successive ducts of the exhaust manifold until it reaches the low pressure exhaust duct when its pressure is reduced to substantially that of the compressor.

Compressor—Figs. 5, 6, 6a and 7

The compressor, designated as a whole in Figs. 1 and 12 by the numeral 10, consists of an outer cylindrical casing 10a supported on suitable standards not shown. At the discharge end flange 10b of the casing is bolted to flange 12b of the separator casing 12a. Through a portion of its length within the compressor housing or casing 10a is an internal helical gear, as shown in cross section at 10c. The teeth of this internal gear mesh with the teeth of a plurality of helical gears 29. Gears 29 are carried by shafts 30 which bear in a frame or spider 31 keyed to shaft 19. Also fixedly mounted upon and rotating with shaft 19 is a rotor 32. The shape of the rotor is best indicated in Figs. 6 and 6a. It will be noted from these two figures that the ends of the rotor arms move in a circle defined by the crests of the internal helical gear. The spaces between the arms are substantially semicylindrical to accommodate the plurality of rotating helical gears 29. It should also be noted that the arms of the rotor taper longitudinally from the inlet end of the compressor toward the discharge end providing a larger amount of space between gears 29 and the arms of the rotor at the inlet than at the outlet, as shown in Figs. 6 and 6a. In other words, the arms of the rotor do not fit as closely about the helical gears 29 at the inlet end as they do at the discharge end providing an increased amount of space for the introduction of air which gradually diminishes to a minimum at the discharge ends of the gears. Rotating with the spider 31 and helical gears 29 and mounted at the discharge end of the gears is a plate 33. The plate is notched at four locations two of which are shown in Fig. 7 and designated by the numeral 33a. The width of these openings is decreased when the discharge pressure of the compressor is increased and enlarged when the discharge pressure is decreased. Discharge plate 33, therefore, serves as a closure plate at the discharge end of the helical gears and rotor thus preventing the previously compressed air from backing up into the pressure passageway of the compressor.

Shaft 19 bears in rotor bearings 34 which are carried by radial supports 35. Rotation of the helical gears 29 would result from rotation of the spider or frame 31 upon which they are mounted and the fact that their teeth mesh with the teeth of the internal helical gear. There is, however, provided separate driving gears adapted to reduce frictional contact between gears 29 and the internal gear of the compressor housing. These driving gears comprise a large internal gear 36 cut in a boss formed in the housing 12a whose teeth mesh with pinions 37 mounted on shafts 30 at the discharge end of the compressor.

In operation the compressor functions as follows: Air is introduced through inlet 10a and enters the spaces surrounding the teeth of the helical gears 29 and between these teeth and the rotor arms as well as the spaces between the teeth of the internal gear and the extremities of the rotor arms. Since the teeth of the helical gears mesh with the internal gear a relatively tight compression chamber is created in the compressor between the inlet and discharge. With rotation of the shaft the rotor and spider supporting the peripheral gears surrounding the rotor also revolve. The air charge advances along the gears with their rotation to be discharged at a maximum pressure through notches 33a in the discharge plate. Since the intake air receives a charge of highly dispersed water mist or other coolant from the atomizing jets 14, the temperature of the air is raised much less during its compression.

Returning to the manner in which pressure on the air is increased in the compressor, the rotation of helical gears 29 about the axis of the shaft and rotor and rotation of these gears upon their own axis due to engagement with the internal gear and driving gears 36 and 37 compresses air supplied through the inlet 10a. As the helical teeth of gears 29 engage the teeth of the internal gear along a diagonal line of contact the meshing of the teeth progresses as the gears from the inlet end of the compressor move toward the discharge end reducing the volume of the air trapped between the toothed spaces as the contacting surfaces advance.

External gear type rotary screw compressors are well adapted to high speed operation existent when the compressor is mounted upon the shaft of a high speed prime mover such as a turbine as shown. However, for a given tooth depth and pitch circle diameter the external gear type compressor provides approximately one-third the number of helical teeth and toothed spaces as the internal gear type of like dimensions. This difference is due to the different speeds at which the engaging toothed surfaces move in the two types of construction. In the external type the outer extremities of the teeth are always moving faster than points on the pitch circle and must mesh with the root surfaces which are moving slower than pitch circle points. Due to the close fit required in the teeth of a compressor this condition calls for comparatively wide teeth and toothed spaces. The instant compressor utilizing meshing helical gears with an internal gear within the compressor housing provides a system wherein the outer tooth extremities of the smaller gears moving faster than the pitch circles of said gears engage the root surfaces of the internal gear. Also the outer tooth extremities of the internal gear advance along the root surfaces of the engaging smaller gears at a rate relatively slower than the common pitch circle speed. This closer approximation of the same speed for the engaging tooth surfaces of the respective gears permits a much narrower tooth and toothed spaces. The very substantial increase in the number of teeth is most important for high compression. In a screw gear compressor operating without actual contact of engaging surfaces the maximum pressure is proportional to the number of pressure zones provided between the compressor intake and outlet. These zones are limited to the number of teeth and toothed spaces under compression between the inlet and outlet passageways.

Another advantage of the compressor utilizing an internal gear is that it lends itself to a closer approach to isothermal compression through its ability to carry a heavy charge of moisture combined with the air without danger of moisture separation and failure of the mechanism occasioned by filling of the clearance spaces with liquid. By offering a closer approach to isothermal compression the power required to operate the compressor is less than in single stage adiabatic compression. Savings in total power necessary to operate the compressor are of the order of 18% to 35% depending on the final pressure at the discharge from the compressor. This is especially important in a gas turbine unit where the mass of air compressed is often as much as four times the mass needed for complete combustion of the fuel charge. A compressor of this type into which a water mist is charged lends itself admirably to the use of rubber surfaced gears to form a positive seal and provide higher pressures without heavy leakage losses. The water mist in such operation offers an exceedingly effective lubricant between the rubber covered surfaces; also, if but half of the working surfaces are rubber film bonded the water mist is an effective lubricant between the rubber and metal. It is contemplated that the large internal gear in the casing and the cavities between the arms of the rotor could be rubberized while the peripheral helical gears 29 would have metal surfaces. This design offers a compressor which would be efficiently lubricated with the water mist or humidity present in the air being compressed. A further advantage of this type of compressor is the absence of valves and the necessity for maintaining end clearances which impair volumetric efficiency.

*Moisture separator—Figs. 8, 9, 10 and 11*

The housing 12a of the water separator is bolted to the discharge end of the compressor. The housing itself is in two parts centrally flanged and bolted, as shown in cross section in Fig. 8. At the discharge end of the separator is packing gland 38 which seals the housing about shaft 19. Mounted upon the shaft within the housing are concentric shells 39 and 40, the inner shell having substantially the diameter of the shaft at its ends and tapering to an extreme diameter centrally of the housing. The outer shell 40 also has its minimum diameter at its extremities and its maximum diameter at its central portion. Longitudinal radial vanes 41 are located in the annular space between shells 39 and 40. The vanes are pitched slightly, as shown in Fig. 9, to facilitate the flow of air through the separator. Shells 39 and 40 are mounted on shaft 19 and rotate with the shaft. Centrally of the outer shell are a plurality of apertures 41a through which separated moisture is discharged as the shells rotate. Water discharged from apertures 41a passes from the separator housing through a drain hole 42 into a trap 43 below the separator. In the trap is a float control 44 which regulates a discharge valve 45 in the liquid drawoff line 13.

Moisture laden air discharged from the compressor passes through the partitioned annular space between rotating shells 39 and 40. While passing through these ducts the heavier particles of moisture are projected by centrifugal force to the inner surface of the outer shell where they accumulate and drain off through holes 40a. This moisture drains into the bottom of the separator housing and passes out through aperture 42 to the water trap 43 from which it is discharged by float regulated valve 45.

The dehumidified air passing through the ducts between the shells formed by partitions 41 follows the course shown by the arrows and is discharged from the separator through pipe 14 through which it is directed to the combustion chamber.

In so far as the separator is concerned centrifugal separation of fluids of different weights is recognized to be old practice, but in the separator employed in the instant power unit separation is effected without seriously reducing the rate of flow of the air between the compressor and combustion chamber. A further advantage of the separator is its large capacity at high speed.

*Modified type combustion chamber—Figs. 13, 14 and 15*

The construction of the combustion chamber used in this modified type of power unit shown in Fig. 12 is generally similar to that shown in Figs. 2, 3, and 4. The chamber housing 15a is closed at its ends by an inlet plate 15b and an outlet plate 15c. Through the housing extends shaft 19 upon which is mounted rotor 28 separated into cells or explosion chambers by radial partitions 28a. Connected into the inlet plate of the chamber is a manifold 47 centrally divided into two separate ducts 47a and 47b, as indicated in Fig. 14. Into one of the ducts 47a of the manifold is connected pipe 43 through which passes the combustible mixture of fuel and air from carburetor 27. To the other duct 47b is connected pipe 26 through which moisture laden air discharged from the compressor is passed to the combustion chamber. Pipe 14, which carries dry air from the separator to the carburetor, is provided with a valve 14a, and likewise pipe 26 is equipped with a valve 26a for regulating the flow of moisture laden air to the combustion chamber. The electrically controlled hot spot or plug 17 in this modification is mounted on the inlet plate. Connected into the outlet plate 15c is the discharge manifold 22a similarly partitioned, as in Fig. 2.

In this modified type combustion chamber rotor 28, as before, revolves with the shaft 19. When one of the combustion cells 28b registers with the inlet manifold 47, a charge of the combustible mixture is introduced through ducts 47a and a charge of moisture laden air through duct 47b, the relative proportions of which are controlled as desired by valves 14a and 26a. The sequence in which the separate charges of combustible mixture and moisture laden air are introduced are arranged to render the combustible mixture more readily available to ignition by plug 17. Upon ignition the pressure of the gases within the cell immediately rises and is discharged upon rotation of the rotor when the cell registers with the discharge openings in the exhaust manifold as described. The expanded gases are directed as before through pipes 22 to the prime mover.

The operation of the combustion chamber used in the power unit of Fig. 12 and detailed in Figs. 13, 14 and 15, in general, is similar to that just described. In this chamber, however, instead of introducing sufficient excess air into each cell to reduce combustion temperature to that desired a charge of humidified air is introduced to the cells to reduce the temperature. The mechanism for accomplishing this is shown in Fig. 12 where a stream of the humidified air is taken from the unit ahead of the separator and is conducted to the intake manifold through a separate conduit. By division of the intake manifold into separate ducts the moisture laden air is charged to each cell prior to the introduction of the combustible mixture. At the time of injecting the combustible mixture the gas in the cell is again ignited and the cycle proceeds as before. In the operation of this type combustion chamber a carbureting device is employed instead of a fuel jet. Also the hot spot or ignition means is located in the intake plate to ignite the combustible mixture which is the last charge to enter the combustion cell. Also the intake opening must have such dimensions as to give the entering charge a flow speed in excess of the speed of flame propagation to avoid a flare back through the intake opening.

The rotors within the combustion chambers provide a revolving series of individual combustion cells wherein fuel charges are successively ignited and combustion substantially completed at constant volume before uncovering the ports that lead to the prime mover. By employing a series of contiguous exhaust ports for conducting the power gas from the combustion chamber to the prime mover a range of pressures from the highest pressure to substantially compressor pressure are employed. At the same time this arrangement provides a supply of power gas to appropriate pressure zones in the prime mover in a steady flow and at pressures suitable for the respective pressure stages of the prime mover. If a jet propulsion prime mover is used one or more of the exhaust conduits from the combustion chamber could drive the turbo-compressor while the balance would be conducted to the jet propulsion nozzles.

Alternative operation

An operation not shown but contemplated would be one in which the power unit utilized air from the compressor charged with a predetermined amount of moisture and without separation of any of the moisture on discharge from the compressor. This operation would dispense with the water separator entirely but under such conditions the moisture added to the air must be closely controlled within limits which would provide the desired characteristics to the combustible mixture and would not unduly dampen the expansive force of the gases when ignited in the combustion chamber.

In this third type of operation, where the separator is eliminated and the control of moisture in the air is governed by the introduction of water to the compressor inlet, regulation of the air and fuel to each cell of the combustion chamber would be controlled as in the unit shown in Fig. 1. The amount of excess air and the degree to which the air was humidified would in this type of operation be the important factors for controlling the combustion at a proper temperature. In all adaptations described manual control of the fuel inlet would govern the control of the speed of the prime mover. If it is desired to operate the prime mover at constant speed a conventional governing device could be used to control the fuel rationing to the combustion chamber.

In all types of operation a starting motor, not shown, would be provided to rotate shaft 19 until the elements of the units begin to function. Rotation of the main compressor shaft charges moisture laden compressed air to the separator.

In the separator, according to the type unit which is being operated, all or a portion of the moisture is extracted from the air. From the separator the air passes to the combustion chamber where it is ignited and combustion takes place while the gases are maintained at a constant volume. The power gas is then discharged at this increased pressure through pipes 22 to the prime mover. In so far as the combustion chamber is concerned important gains in the overall efficiency of the unit are principally due to the combustion of fuel at a constant volume, and efficiencies effected by higher pressures which are possible with the type of compressor shown. Savings are substantial due to higher pressures possible with this type compressor even when combustion is at constant pressure as is conventional in most gas turbines or jet propulsion units. It is generally recognized that efficiencies employing constant volume are substantially greater than those employing constant pressure.

From the foregoing it will be seen that this invention is one well adapted to attain all of the ends and objects hereinbefore set forth together with other advantages which are obvious and which are inherent to the structure.

It will be understood that certain features and sub-combinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having thus described my invention, I claim:

1. A power unit of the character described comprising a compressor and a gas propelled prime mover mounted upon a continuous shaft, a constant volume combustion device having a fuel supply interposed between the compressor and prime mover and pipe connections between the compressor and combustion device for the passage of high pressure air, and a plurality of pipe connections from the combustion device to the prime mover for the passage of power gas, the gas being at different pressures in the respective ones of said last pipe connections.

2. A power unit as in claim 1 in which the combustion device comprises a chamber, a rotor mounted on a separate shaft within the chamber, said rotor shaft gear driven from the compressor shaft.

3. A power unit as in claim 1 in which the compressor is of the helical gear type having a central rotor, a plurality of meshing gears arranged about the periphery of the rotor, an internal gear within the compressor housing meshing with the peripheral gears, the central rotor and shaft mountings of the peripheral gears rotatable with the compressor shaft.

4. A power unit of the character described comprising a compressor, a moisture separator and gas propelled prime mover mounted upon a continuous shaft, means for introducing moisture into the air supplied to the compressor, a constant volume combustion device having a fuel supply interposed between the compressor and prime mover, a conduit from the compressor to the separator for the passage of high pressure moist air, a conduit from the separator to the combustion device for the passage of high pressure dry air and a plurality of pipe connections between the combustion device and prime mover for the passage of power gas, the gas being at different pressures in the respective ones of said last pipe connections.

5. A power unit of the character described, comprising a multi-stage gas turbine having a plurality of gas intake ducts connected respectively to said stages, the other end of said ducts connecting to a common housing, a rotor in said housing connected to and driven by said turbine, a cavity in the rotor defining with the interior of the housing an enclosed chamber adapted to register with said ducts successively as the rotor turns, means for introducing a combustible mixture into said cavity when it is out of register with said ducts, and means for igniting the mixture.

6. A power unit of the character described, comprising a multi-stage gas turbine having a plurality of gas intake ducts connected respectively to said stages, the other end of said ducts connecting to a common housing, a rotor in said housing connected to and driven by said turbine, a plurality of cavities in the rotor each defining with the interior of the housing an enclosed chamber adapted to register with said ducts successively as the rotor turns, means for introducing a combustible mixture into each cavity in turn as it reaches a predetermined position out of register with the ducts, and means for igniting the mixture in each cavity in turn as said cavity reaches another predetermined position.

7. A power unit of the character described comprising a multi-stage gas turbine having a plurality of gas intake ducts connected respectively to said stages, a combustion chamber, means for introducing a combustible mixture into said chamber and igniting same, said chamber having valve apparatus connected to and driven by said turbine for connecting the chamber to the different ones of said ducts successively during the combustion cycle of the mixture.

8. A power unit of the character described comprising a multi-stage gas turbine having a plurality of gas intake ducts connected respectively to said stages, a plurality of combustion chambers, means for introducing a combustible mixture into said chambers in cyclic succession and igniting the mixture in each chamber, and cyclically-operated valve apparatus for connecting the chambers to the ducts in turn, whereby each duct always has connected thereto a combustion chamber wherein the mixture has reached a predetermined point in the combustion cycle.

9. A power unit of the character described comprising a gas propelled prime mover having a plurality of gas intake ducts, an air compressor connected to and driven by the prime mover, means for introducing moisture into the air supplied to said compressor, a moisture separator connected to the compressor's exhaust to remove the moisture from the compressed air, a combustion chamber connected to the separator to receive the dried air therefrom, means for introducing fuel into the air in said chamber and igniting the resultant combustible mixture, said chamber having valve apparatus driven by said prime mover for connecting the chamber to the different ones of said ducts successively during the combustion cycle of the mixture.

10. A power unit as in claim 9 wherein said moisture separator is a centrifugal separator driven by said prime mover.

11. A power unit as in claim 9 having a supplementary connection between the compressor and the combustion chamber whereby moist air discharged from the compressor may bypass the separator.

12. A power unit of the character described comprising a compressor, a separator and a gas propelled prime mover mounted on a shaft, means for introducing moisture to the air supplied to the compressor, a constant volume combustion chamber, a radially partitioned rotor mounted on a separate shaft geared to the compressor shaft and rotating within the combustion chamber, said rotor forming a plurality of pockets with the combustion chamber, ignition and fuel means operative with the combustion chamber, combustion chamber inlet and discharge ports connecting with said pockets, the inlet port connected with the separator and the discharge port with the prime mover, and a supplementary connection between the compressor and combustion chamber whereby moist air discharged from the compressor may bypass the separator.

13. A power unit as in claim 12 including controls for regulating the relative proportions of moisture denuded air and moist air supplied to the combustion chamber.

14. A power unit as in claim 9 including a supplementary connection between the compressor and the combustion chamber and controls for regulating the relative proportions of moisture denuded air and moist air supplied to the combustion chamber.

JOSEPH F. KEYS.

REFERENCES CITED

The following references are of record in the file of this patent:

UNITED STATES PATENTS

| Number | Name | Date |
| --- | --- | --- |
| 1,253,969 | Henry | Jan. 15, 1918 |
| 2,078,958 | Lysholm | May 4, 1937 |
| 2,115,338 | Lysholm | Apr. 26, 1938 |
| 2,238,905 | Lysholm | Apr. 22, 1941 |
| 2,358,815 | Lysholm | Sept. 26, 1944 |
| 2,389,632 | Mossbach | Nov. 27, 1945 |

FOREIGN PATENTS

| Number | Country | Date |
| --- | --- | --- |
| 29,311 | Great Britain | Dec. 16, 1910 |
| 111,381 | Great Britain | Nov. 29, 1917 |